US012571064B2

(12) United States Patent
Codd et al.

(10) Patent No.: US 12,571,064 B2
(45) Date of Patent: Mar. 10, 2026

(54) INTEGRATED WELDING AND THERMAL PROCESSING JOINING METHOD FOR CREEP STRENGTH ENHANCED FERRITIC STEELS

(71) Applicants: Daniel S. Codd, San Diego, CA (US); Joseph J. McCrink, Carlsbad, CA (US)

(72) Inventors: Daniel S. Codd, San Diego, CA (US); Joseph J. McCrink, Carlsbad, CA (US)

(73) Assignee: KVA TECHNOLOGIES, Borrego Springs, CA (US)

( * ) Notice: Subject to any disclaimer, the term of this patent is extended or adjusted under 35 U.S.C. 154(b) by 378 days.

(21) Appl. No.: 17/987,484

(22) Filed: Nov. 15, 2022

(65) Prior Publication Data

US 2023/0151450 A1 May 18, 2023

Related U.S. Application Data

(60) Provisional application No. 63/279,326, filed on Nov. 15, 2021.

(51) Int. Cl.
| | |
|---|---|
| *C21D 9/08* | (2006.01) |
| *B23K 31/02* | (2006.01) |
| *C21D 1/42* | (2006.01) |
| *C21D 6/00* | (2006.01) |
| *C22C 38/00* | (2006.01) |
| *C22C 38/04* | (2006.01) |
| *C22C 38/22* | (2006.01) |
| *C22C 38/24* | (2006.01) |
| *C22C 38/26* | (2006.01) |

(52) U.S. Cl.
CPC .............. *C21D 9/08* (2013.01); *B23K 31/027* (2013.01); *C21D 1/42* (2013.01); *C21D 6/002* (2013.01); *C21D 6/005* (2013.01); *C22C 38/001* (2013.01); *C22C 38/04* (2013.01); *C22C 38/22* (2013.01); *C22C 38/24* (2013.01); *C22C 38/26* (2013.01); *C21D 2211/008* (2013.01)

(58) Field of Classification Search
None
See application file for complete search history.

(56) References Cited

U.S. PATENT DOCUMENTS

| | | | |
|---|---|---|---|
| 7,618,503 B2 * | 11/2009 | McCrink ................ | C21D 9/505 |
| | | | 148/663 |
| 9,339,972 B2 | 5/2016 | Gordon | |

| | | | |
|---|---|---|---|
| 2008/0115863 A1 | 5/2008 | McCrink et al. | |
| 2021/0086315 A1 | 3/2021 | Sorrentino | |
| 2022/0134476 A1 | 5/2022 | Vorontsov et al. | |

FOREIGN PATENT DOCUMENTS

| | | |
|---|---|---|
| WO | WO 2008/088834 A1 | 7/2008 |
| WO | WO 2015/112978 A1 | 7/2015 |

OTHER PUBLICATIONS

WO, PCT/US22/49960 ISR and Written Opinion, Mar. 1, 2023.
Tang et al., "Heat Input and Post Weld Heat Treatment Effects on Reduced-Activation Ferritic/Martensitic Steel Friction Stir Welds" 1-7. Conference: TMS 2015 144th Annual Meeting & Exhibition, Orlando, FL, USA, www.osti.gov.
Findland, "Conference Proceedings: EPRI-RRAC Fifth International Conference on Welding and Repair Technology for Power Plants", Technical Report, Oct. 2002, EPRI, Palo Alto, CA, USA.
The National Board of Boiler and Pressure Vessel Inspectors, "National Board Inspection Code 2017 Draft Edition", Oct. 10, 2016, Colombus, OH, USA.
Newell, Jr., "Welding and Postweld Treatments of P91 Steels", Welding Journal, Nov. 17, 2009, FABTECH International & AWS Welding Show, Chicago, IL, USA.
Parker et al., "Guidelines and Specifications for High-Reliability Fossil Power Plants, 2nd Edition", 2015, Electric Power Research Institute, Inc., Palo Alto, CA, USA.
Siefert et al., "Temper Bead Repair of T91 Using EPRI P87 Filler Metal", Technical Report, Sep. 2012, EPRI, Palo Alto, CA, USA.
"Ultrasonic Impact Treatment", SONATS, Europe Technologies, 2022, https://sonats-et.com/en/hfmi-treatment/ultrasonic-impact-treatment/.
EP, 22893738.9 Extended Search Report, Oct. 21, 2025.

* cited by examiner

*Primary Examiner* — Jenny R Wu

(74) *Attorney, Agent, or Firm* — ONE LLP

(57) ABSTRACT

An integrated welding and thermal processing method includes heating adjoining surfaces, at least one of which is a creep strength enhanced ferritic (CSEF) steel alloy, to a sufficiently high temperature above their melting points to form a weld. The weld is allowed cool below the martensitic start temperature of one or both CSEF alloys. Thereafter, a supplemental heat source tempers the CSEF alloys by reheating the weld area at a rate of 10° C. per second or greater to above the CSEF alloys' martensitic start temperatures, but not above the austenitization temperature of the CSEF alloys. After the weld's heat affected zone is maintained at a temperature between the CSEF alloys' martensitic finish temperature and martensitic start temperature, the weld is allowed to cool at a rate of 15° C. per minute or greater.

10 Claims, 3 Drawing Sheets

Tm   = Melt temperature
$Ac_3$ = upper critical temperature, austenitization finish temperature
$Ac_1$ = lower critical temperature, austenitization start temperature
$M_s$ = martensitic start temperature
$M_f$ = martensitic finish temperature

INTEGRATED WELDING AND THERMAL PROCESSING JOINING METHOD FOR CREEP STRENGTH ENHANCED FERRITIC STEELS

CROSS-REFERENCE TO RELATED APPLICATIONS

The present application claims the benefit of priority to U.S. Provisional Application No. 63/279,326 titled "Integrated Welding and Thermal Processing Joining Method for Creep Strength Enhanced Ferritic Steels" filed on Nov. 15, 2021, which is incorporated herein by reference in its entirety.

This invention was made with Government support under DE-SC-0020684 awarded by the U.S. Department of Energy, Office of Science, Office of Fusion Energy Sciences. The Government has certain rights in this invention.

BACKGROUND OF THE INVENTION

The present invention generally relates to joining methods for creep strength enhanced ferritic steels, particularly the methods and implementation of an integrated welding and thermal processing method designed to achieve the desired joint mechanical properties and microstructure.

Creep strength enhanced ferritic (CSEF) steels are designed for high integrity structural service at elevated temperatures. These 8-12 wt. % chromium steels are alloyed with molybdenum and controlled additions of vanadium, niobium, and nitrogen and other constituents. These provide precipitation strengthening by the formation of $M_{23}C_6$ carbides and MX carbonitrides, which, in addition to modest solid solution strengthening effects, result in substantially greater creep strength than traditional CrMo and other martensitic steels. Applications range from fossil and nuclear power generation piping, tubing, headers, turbine casings, boilers, pressure vessels, heat exchangers, and other non-power applications including petrochemical and high temperature process equipment. In particular, modified 9% Cr-1% Mo alloys, with Grade 91 being the most extensively studied, have been favored for superior thermal, physical and elevated temperature strength when properly processed, at significantly lower cost than austenitic stainless alloys. Grade 91 composition is controlled under ASTM A387/ ASME SA 387 specifications for plate form, and ASTM A335/ASTM 691/ASME SA213 specifications for tube and pipe forms. Grade 91 creep resistant alloy nominal composition contains by weight: chromium (Cr) 8.00-9.50%; molybdenum (Mo) 0.85-1.05%; carbon (C) 0.08-0.12%; vanadium (V) 0.18-0.25%; manganese (Mn) 0.30-0.60%; silicon (Si) 0.20-0.50%, nitrogen (N) 0.03-0.07%; columbium (Nb) 0.06-0.10%; controlled maximum impurities for phosphorous (P), sulfur(S), nickel (Ni), aluminum (Al), titanium (Ti), and zirconium (Zr); with the iron (Fe) as the balance. Research literature and industry provide a wealth of material performance data for these alloys. However, service experience has confirmed what theory predicts: failures can occur in components very early in life if the required microstructure is not developed and/or maintained during processing.

Welding is necessary to create complex assemblies; heat input alters the precise microstructure which enhances mechanical properties. The desired properties of CSEF alloys are dependent on achieving a tempered martensite microstructure after cooling from the austenitizing temperature. As a result, welded joints must undergo specific post weld heat treatment (PWHT) procedures to restore performance. PWHT of large or complex structures are costly, difficult, time consuming, and prone to error-premature failures are encountered due to design, improper heat treatment, inadequate experience, or failing to observe procedures.

Modifications of CSEF alloys have been identified for use in fusion reactor structural components. These steels have converged to a nominal 8-9 wt. % Cr content, with goals implied for a reduced activation material complying with waste disposal and materials recycling limits, require alloying elements Mo and Nb generally used in CSEF steels such as Grade 91 and Grade 92 to be replaced by tungsten (W) and tantalum (Ta). There are also restrictions on the content of other alloying elements (e.g., Ni, Co) and impurities (e.g., Ag, Al) in these nuclear application steels. These reduced activation ferritic-martensitic (RAFM) steels exhibit the same behavior upon welding: high hardness fusion and heat affected zones as compared to the base metal. Hence, fusion reactor development has assumed the need for conventional off-line PWHT of welded RAFM structures to reduce weld brittleness, cracking tendencies, and restore high temperature creep performance. However, the PWHT itself can result in additional risks such as distortion, or even PWHT-induced cracking. In fusion-specific applications, this is compounded from dissimilar material stacks and varying thicknesses throughout large structural modules.

Conventional PWHT, either with localized heat implements applied hours or days after the initial weld joint has fully cooled, or batch heating on the entire structure, are the industry standard, with regulatory approvals structured around this conventional solution. Codes also may require specific joint preheating and post weld heating temperatures and times, designed to limit the final hardness and brittleness of the weld. US Patent Application US20020170634 describes a modification to this conventional PWHT processing with extended hold times at elevated temperatures followed by slower than air cooling for already created weldments; a localized approach is taught by U.S. Pat. No. 9,840,752. However these methods require lengthy secondary processing and can cause excessive distortion of the structure or cracking of the welded joint.

Alternate methods have been developed to overcome some of the conventional difficulties with PWHT, where PWHT is impractical or not cost-effective. The Electric Power Research Institute (EPRI) has published on temper bead or "controlled fill welding" and has succeeded in obtaining code case approval. This process involves the use of a dissimilar alloy filler bead applied over the structural weld. Similarly, US Patent Application US20030038167 describe multi-pass weld joint build up followed by a cap weld layer which can be used to temper previous weld layers. In both methods, heat input from the overlay weld provides limited softening of the CSEF steels. This process has clear limitations and additional costs.

Alternatively, U.S. Pat. No. 10,994,361 teach a modified weld joint geometry to improve damage tolerance in CSEF weldments. U.S. Pat. No. 7,371,988 describes a modified weld schedule using lower hardness materials of alternate composition to "butter" the joint edges before final connection. Modifying weld design geometry or material composition is not always practical for critical high temperature components, so this approach has limited applicability. Sonats European Technologies Group, a French industrial firm specializing in mechanical impact surface treatment technologies, is commercializing an ultrasonic impact treatment to improve the fatigue resistance of welded structures.

It is known that imparting residual compressive stresses on surfaces reduces cracking tendencies in cyclic loading; the Sonats device strikes the weld toe with a needle striker. This process has yet to be proven for improving impact toughness and creep strength in high temperature alloys, and is by nature slow and difficult to control, requiring multiple passes.

Newer materials are being developed to alleviate some of the inherent challenges with CSEF steels. These include nano-strengthened alloys described in U.S. Pat. No. 7,160, 399, modifications of existing alloys described in U.S. Pat. No. 9,181,597, and new filler materials as described in U.S. Pat. No. 10,456,873 and Canada Patent No. CA2259826C. These alloys have been developed with conventional methods or computational modeling. However, Grade 91 and similar CSEF alloys are favored for their extensive materials property database developed since the 1970s, and technologies which facilitate their use will be preferred in the conservative power generation industry.

EPO Patent No. EP2511041 explains that hybrid welding methods with dual heat sources have been shown to increase throughput and weld deposition rates on conventional materials. The addition of a secondary heat source is typically used to pre-heat either or both of the base metal and filler metals which will be fused together in the welded joint. These methods seek to increase deposition rate and/or weld penetration, and do not attempt to control the weld cooling profile and resultant microstructure. Lastly, U.S. Pat. Nos. 7,540,402 and 7,618,503 teach a hybrid welding mode with a supplemental heat source designed to slow the rate of cooling and resulting hardness as intended for roll formed martensitic stainless steel tubing and other autogenous weldments.

BRIEF SUMMARY OF THE INVENTION

Disclosed herein is an integrated welding and thermal processing method for welding steel structures which includes a creep resistant alloy welded to a weldable alloy. Preferably, but not necessarily, both adjoining surfaces of the weld created and treated by the integrated welding and thermal processing are creep resistant alloys. For example, the integrated welding and thermal processing method is described for use in treating a weld joint including two surfaces made of the same structural component, such as a weld intended to produce the longitudinal weld seam of a tube or pipe. However, the integrated welding and thermal processing method may be used to weld and treat a surface made of one creep resistant alloy to another surface of another creep resistant alloy, or to weld and treat a creep resistant alloy to a non-creep resistant weldable alloy.

For purposes herein, "creep resistant alloy" is defined as a ferritic alloy having a carbon content equal or greater than 0.07% by weight, having a chromium content of 8.0%-12% by weight; and having molybdenum (Mo) or vanadium (V) or tungsten (W) or tantalum (Ta) or combinations thereof content of 0.85% or greater by weight. Further, common creep resistant alloy chemical composition and mechanical properties are controlled under ASTM A387/ASME SA 387 specifications for plate, and ASTM A335/ASTM 691/ASME SA213 specifications for tube and pipe. Preferred creep resistant alloys include, but are not limited to, CSEF and RAFM alloys including CSEF Grade 91, 92, and X12 alloys and RAFM Eurofer97, CLAM, F82H, JLF-1. As understood by those skilled in the art, CSEF alloys contain molybdenum and vanadium of 0.85% or greater by weight. Conversely, RAFM alloys substitute the molybdenum for tungsten and tantalum. However, for both the CSEF and RAFM alloys, the creep resistant alloys contain a combination of molybdenum (Mo) or vanadium (V) or tungsten (W) or tantalum (Ta) content of 0.85% or greater by weight.

The integrated welding and thermal processing method includes welding a first surface of a creep resistant alloy to a second surface of a welable alloy, which is preferably a creep resistant alloy, by applying a first heat source to the first and second surfaces to heat them to a sufficiently high temperature above their melting points to form a weld. The integrated welding and thermal processing method further includes allowing the weld to cool below the martensitic start temperature of the one creep resistant alloy, if only one surface is a creep resistant alloy, or allowing the weld to cool below the martensitic start temperature of both creep resistant alloys, if both surfaces are creep resistant alloys.

Thereafter, a second heat source is utilized to temper the creep resistant alloys, and specifically to temper the weld and the surrounding heat affected zone. Importantly, the weld is not allowed to cool either to the martensitic finish or room temperature before the second heat source is applied to the weld. Various heat sources may be selected by those skilled in the art including induction coil, laser, gas metal arc welding (GMAW), gas tungsten arc welding (GTAW), plasma arc welding (PAW), resistance, electron beam, or solid-state (i.e., friction stir welding). Importantly, this step of tempering the creep resistant alloys is initiated after the weld has been allowed to cool to below the creep resistant alloys' martensitic start temperatures. The weld is tempered by reheating the weld area at a rate of 10° C. per second or greater to above the creep resistant alloys martensitic start temperatures. However, the weld is not heated to not above the austenitization temperature of the creep resistant alloys.

The weld is maintained at a temperature between creep resistant alloys' austenitization start temperature and martensitic start temperature for a sufficient amount of time to transform the weld and heat affected zone into tempered martensite and very fine carbides. Once tempered to a desired increase in ductility and toughness, the weld is allowed to cool at a rate of 15° C. per minute or greater.

Thus, it is an object of the invention to overcome the difficulties associated with welding creep resistant alloy without requiring weld pool dilution using non-matching weld filler alloys, or lengthy off-line pre- and/or PWHT.

Other features and advantages of the present invention will be appreciated by those skilled in the art upon reading the detailed description which follows with reference to the drawings.

DETAILED DESCRIPTION OF THE INVENTION

Figure 1:
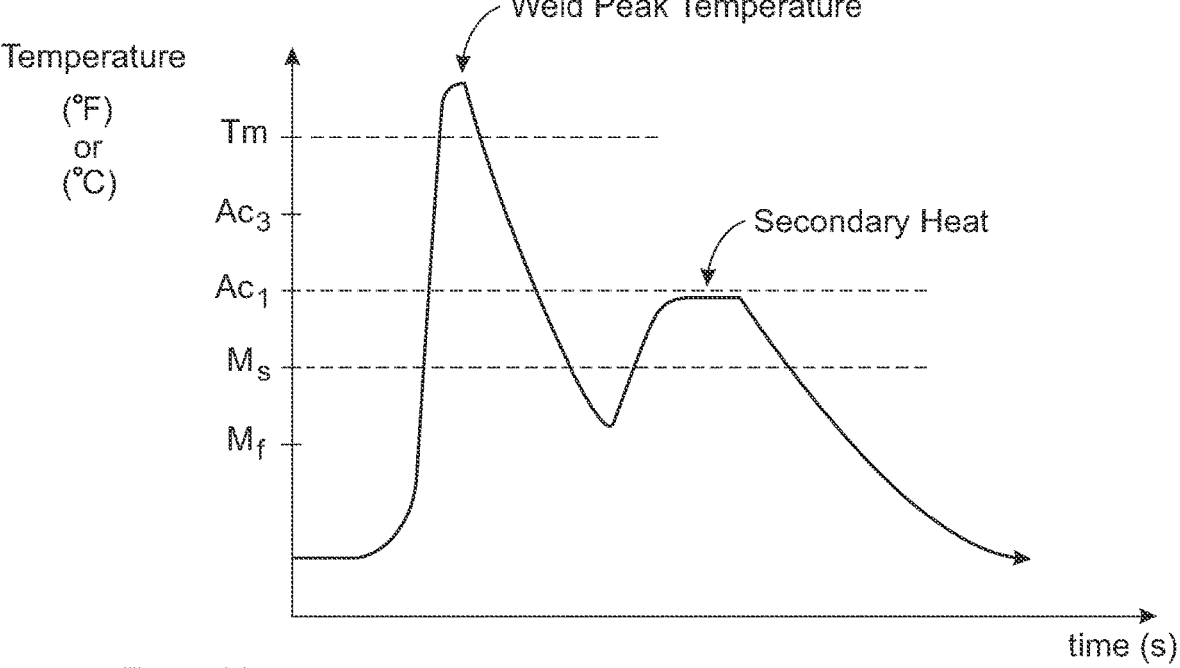
FIG. 1 is a plot of the temperature profiles obtained using the integrated welding and thermal processing method applied to Grade 91 CSEF steel.

The present invention addresses the aforementioned disadvantages by providing an integrated welding and thermal processing method for creep resistant alloys. While the integrated welding and thermal processing method is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

Although the following description refers specifically to creep resistant alloys including CSEF steels and RAFM alloys, the present invention is applicable to any hardenable ferrous alloy having a carbon content equal or greater than 0.07% by weight, and having a chromium content of 8.0%-12% by weight; and having molybdenum (Mo) or vanadium (V) or tungsten (W) or tantalum (Ta) or combinations thereof content of 0.85% or greater by weight, and which it is desired to have a weldment with reduced hardness and increased toughness, without subjecting the joint to a separate PWHT. Typical CSEF grades include modifications of ASTM/ASME SA-213 T9 (Grade 9) 9Cr-1Mo alloys including, but not limited to: Grade 91, Grade 92, Grade 911, Grade 122, Grade 23, VM12HC, and specialty RAFM alloys including, but not limited to: Eurofer97, F82H, JLF-1, CLAM, and oxide dispersion-strengthened (ODS) alloys, also known as nanostructured ferritic alloys (NFA).

As previously described, common creep resistant alloy composition is controlled under ASTM A387/ASME SA 387 specifications for plate, and ASTM A335/ASTM 691/ ASME SA213 specifications for tube and pipe; the representative Grade 91 creep resistant alloy nominal composition contains primarily Fe, with Cr 8.00-9.50%; Mo 0.85-1.05%; C 0.08-0.12%; V 0.18-0.25%; and Nb 0.06-0.10% by weight, with minor additions of Mn, Si, and N, and impurity limits for P, S, Ni, Al, Ti, and Zr. Typical Grade 92 composition contains primarily Fe, with Cr 8.50-9.50%; Mo 0.30-0.60%; C 0.07-0.13%; V 0.15-0.25%; W 1.50-2.00%; and Nb 0.04-0.09% by weight, with minor additions of Mn, Si, B and N, and impurity limits for P, S, Ni, Al, Ti, and Zr.

RAFM creep resistant alloy compositions are modifications of these of ferritic-martensitic 8-12% Cr—MoVNb steels mainly by exchanging Mo, Nb and Ni with W and Ta in order to obtain low activation capability. For example, Eurofer97 composition targets by weight are Cr 8.50-9.50%; C 0.09-0.12%; W 1.00-1.20%; V 0.15-0.25%; Mn 0.20-0.60%; Ta 0.10-0.14%; N 0.015-0.045%, with impurity limits for Nb, Mo, Ni, Cu, Al, Ti, Si, Co, P, S, B and O. Similarly, F82H, another RAFM creep resistant alloy, has target composition by weight of Cr 8.00%; C 0.10%; W 2.00%; V 0.20%; Mn 0.30%; Ta 0.04%; N 0.010%, with impurity limits for Nb, Mo, Ni, Cu, Al, Ti, Si, Co, P, S, B and O.

Figure 2:
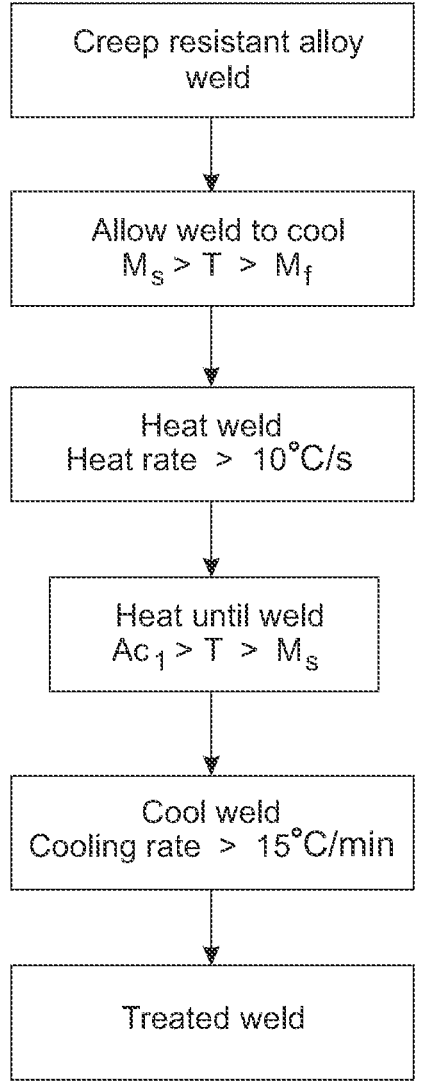
FIG. 2 is flow chart illustrating the integrated welding and thermal processing method.
Figure 3:
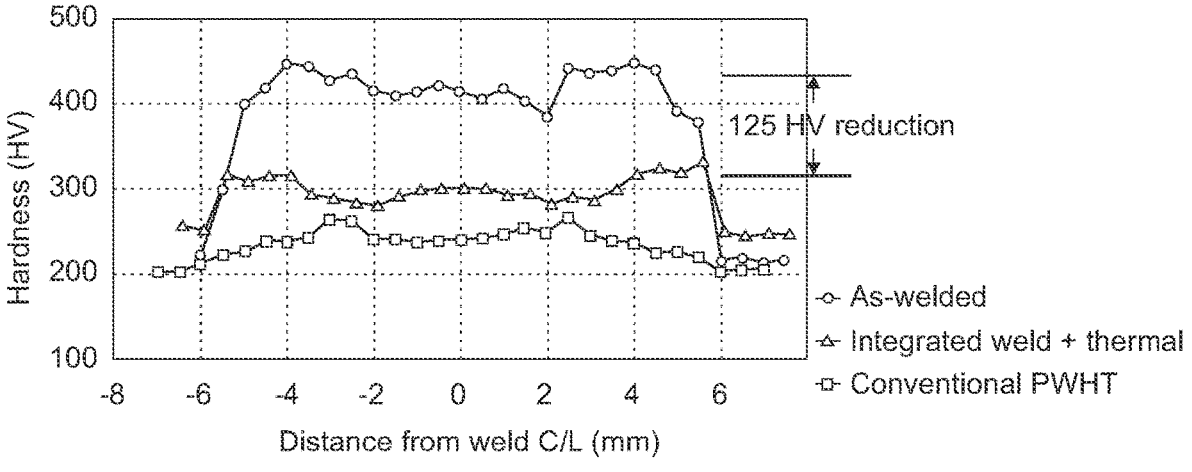
FIG. 3 is a plot of the hardness profiles obtained using conventional weld processing and PWHT as compared to the integrated welding and thermal processing method as applied to Grade 91 CSEF steel.

With reference to FIGS. 1-3, the integrated welding and thermal process is accomplished with the addition of a secondary heat source to provide supplemental heating immediately following weld pool solidification. Certain embodiments of the present invention include, but are not limited to, a gas tungsten arc welding (GTAW) primary heat source closely coupled to a single sided induction coil with infrared pyrometer feedback. Other primary and secondary heat sources may include laser, gas metal arc welding (GMAW), plasma arc welding (PAW) resistance, electron beam, or solid-state (i.e., friction stir welding). Weld processes may be autogenous or use matching or dissimilar filler wire composition. The coupled design with adjacent primary-secondary heat sources allows for independent control of the welding operation (e.g., weld penetration, fusion zone width, deposition rate, travel speed) and the in-situ weld cooling profile. Linear and curved joints on materials of varying thickness are possible with such an arrangement, including but not limited to multi-pass weldments on thick sections.

As demonstrated, a solid state induction heater can offer digital control of induction frequency, penetration depth and width, and overall power when used as a secondary heat source. Control of these parameters, and location of the secondary heat source with respect to the primary weld torch, can define various cooling-control profiles. Immediate temperature feedback can be provided by non-contact means such as infrared pyrometers measuring weld seam surface temperature, among other non-contact and contact-based methods. On some weldments, thermocouples can be affixed to expected heat affected zones (before welding) to control and monitor temperature profiles as function of time.

With reference to FIGS. 1 and 2, the intent of the present invention is to provide inline weld cooling control and reheating up to the lower critical transformation temperature ($A_{C1}$) before the weld cools to ambient temperature. As best illustrated in FIG. 1, the greatest benefits are observed by immediately reheating the weld seam near the lower critical transformation ($A_{C1}$) temperature after weld solidification, with heating parameters dependent on weld travel speed and thickness. This lower critical temperature is a function of the particular alloy composition. As a point of reference, the nominal $A_{C1}$ temperature for "9Cr-1Mo" CSEF steels such as Grade 91 with nominal 9 wt. % chromium content is approximately 810° C. (1490° F.). In certain instances, rapid heating of the freshly created weld in excess of 200° C./s with the secondary heat source can shift the $A_{C1}$ temperature upward when compared with quasi-equilibrium values. This can be exploited in the present invention thereby increasing the process window parameters and weld softening achieved while avoiding further austenitic transformation. To illustrate, industry-recognized standards for conventional PWHT of Grade 91 steel currently dictate an ideal temperature of 760° C. (1400° F.) for 2 hours, maintaining these precise conditions with controls typically calibrated for ±5° C. (9±° F.) accuracy or better. Extreme care is taken to avoid exceeding this temperature threshold, which is approximately 50° C. (90° F.) below the $A_{C1}$ temperature. In contrast, the integrated weld and thermal processing of the present invention is shown to have significant weld softening effects with secondary heat source induced temperatures of 810±20° C. (1490±° F.), a much larger process window of 20° C. (36° F.) below and above the $A_{C1}$ temperature. This secondary heat is applied before the weld cools to room temperature. In typical cases the weld cools very rapidly with cooling rates during solidification on the order of 500-1000° C./s (900-1800° F./s), and secondary heat is applied when the freshly created weld is in the 300° C. (572° F.) temperature range. Once tempered to a desired reduction in weld brittleness and elimination of hydrogen-induced cracking, the weld is allowed to cool at a rate of 15° C. per minute or greater.

This integrated welding method can take the physical form of a novel welding head with an integrated secondary heat source, or discrete components for weld creation and secondary heating. It may be applied to manual welding devices or robotic welding end-effectors. Such precedent exists with hybrid welding modes for enhanced deposition like GMAW/GTAW double arc welding, laser assisted GTAW, or its complement, GTAW assisted laser welding.

This method can solve many of the historical difficulties associated with welding of CSEF steel—and when optimized can promote transformation of the weld and heat affected zone into tempered martensite and very fine carbides. Thus, reducing CSEF weld brittleness and eliminating hydrogen-induced cracking, while improving ductility and toughness, without requiring weld pool dilution using non-matching weld filler alloys, or lengthy off-line pre- and/or PWHT.

Referring to FIG. 3, the integrated welding and thermal processing method was conducted using an experimental weld test sled which allowed for controlled testing of the process on CSEF steel strips using a GTAW weld torch and secondary heating and control using non-contact induction heating equipment. Experiments were carried out on Grade 91 CSEF steel on 3 mm thick square edge butt-joint autogenous weld configurations. The experiment featured Type-K thermocouples affixed to the CSEF specimens prior to welding so that temperature profiles may be monitored. Still referring to FIG. 3, the measured CSEF weld microhardness is plotted for welds created by the aforementioned experiments. Microhardness profiles of conventionally processed and integrated welding and thermal processed welds, Grade 91 CSEF specimens are plotted. "As-welded" refers to conventional welds; "PWHT" denotes conventional "As-welded" specimens subjected to an off-line, 1 hour 732° C. (1350° F.) heat treatment; and "Integrated weld+thermal" correspond to optimal integrated welding and thermal processing parameters. For comparison, results are included from conventional weld processing and conventional welding with an off-line PWHT. CSEF steels exhibit high hardness in the weld fusion zone and heat affected zone upon welding with conventional methods, often exceeding 400 HV. Conventional off-line PWHT is known to reduce hardness in these zones to that near the base metal hardness, 200-250 HV in this case for Grade 91. Optimum integrated welding and thermal processing results in a 125 HV reduction in weld fusion and heat affected zone hardness, nearly approaching that of a conventional PWHT.

Furthermore, the integrated weld and thermal processing technology is ideally suited for RAFM structures within fusion reactors. It is also applicable to all CSEF steels and there is a clear need for improved joining and welding methods for these materials. CSEF alloys are favored by the power generation industry for their cost-effective pressure boundary performance at elevated temperatures and are used in a variety of power generation and high temperature process applications including heat exchangers such as heat recovery steam generators (HRSGs), superheaters, boilers, reactors, pressure vessels and piping. Typical HRSGs are large, complex pipe-tube assemblies with thousands of weldments. Grade 91 and Grade 92 steels are favored for high temperature regions. Sizes can exceed 100 MW, with millions of square feet of heat exchange area and capital costs in tens of millions of dollars. Smaller systems (<5 MW) do exist, and find wide applications across commercial, refining, centralized heating, power generation and petrochemical industry. As large fabricated structures, growth of HRSGs are somewhat limited due to the high cost of construction, transportation, siting, and regulatory concerns. Additional restrictions for PWHT during construction or repair can be limiting-hence the motivation for new shop and field joining technologies such as the invention described here. However, the real cost is after commissioning-a typical plant may experience plant shutdowns for repair work; half of unexpected shutdowns are caused by boiler tubes. Shutdowns for cracked or failing welds are not uncommon, particularly as more plants using CSEF steels are gaining creep-relevant operational experience past their first decade. The integrated weld and thermal processing method described here may also be used for repair work on similar large structures, providing a cost-time-performance advantage to conventional weld and PWHT repair processing.

Accordingly, it will be apparent that various modifications can be made without departing from the spirit and scope of the invention. Therefore, having described my invention in such terms such as to enable a person skilled in the art to understand the invention, recreate the invention and practice it, and having presently identified the presently preferred embodiment thereof, we claim:

The invention claimed is:

1. A method of forming a weld comprising the steps of:
   providing a first surface of a creep resistant alloy having a carbon content equal or greater than 0.07% by weight, having a chromium content of 8.0%-12% by weight, and having a molybdenum (Mo) or vanadium (V) or tungsten (W) or tantalum (Ta) content or combination thereof of 0.85% or greater by weight;
   providing a second surface of a weldable alloy;
   positioning said first surface adjacent to said second surface;
   welding said first surface to said second surface by applying a first heat source to said first surface and said second surface to heat said first surface and second surface to a sufficiently high temperature above their melting points to form a weld;
   cooling said weld to below the martensitic start temperature of said first surface creep resistant alloy but before said weld cools below said first surface's creep resistant alloy's martensitic finish temperature;
   tempering said weld subsequent to said step of cooling, said tempering including heating said weld at a rate of 10° C. per second or greater to above said first surface's creep resistant alloy's martensitic start temperature but to not above the austenitization temperature of said first surface's creep resistant alloy;
   maintaining the weld at a temperature between said first surface's creep resistant alloys' austenitization start temperature and martensitic start temperature for a sufficient amount of time to transform the weld and heat affected zone of said first surface into tempered martensite; and
   cooling said weld at a rate of 15° C. per minute or greater after transforming the weld and heat affected zone of said first surface into tempered martensite.

2. The method of forming a weld of claim 1 wherein:
   said second surface of a creep resistant alloy having a carbon content equal or greater than 0.07% by weight, having a chromium content of 8.0%-12% by weight, and having a molybdenum (Mo) or vanadium (V) or tungsten (W) or tantalum (Ta) content or combination thereof of 0.85% or greater by weight;
   said step of cooling said weld includes cooling said weld to below the martensitic start temperatures for both of said creep resistant alloys but before said weld cools below said martensitic finish temperatures of both of said creep resistant alloys;
   tempering said weld subsequent to said step of cooling includes heating said weld at a rate of 10° C. per second or greater to above both said first and second surfaces' creep resistant alloys' martensitic start temperatures but to not above the austenitization temperature for both of said creep resistant alloys; and
   said step of maintaining the weld at a temperature also includes maintaining the weld at a temperature between said second surface's creep resistant alloys' austenitization start temperature and martensitic start temperature for a sufficient amount of time to transform the weld and heat affected zones of said second surface into tempered martensite; and said step of cooling said weld at a rate of 15° C. per minute or greater occurs after transforming the weld and heat affected zone of both said first surface and said second surface into tempered martensite.

3. The method of forming a weld of claim 2 wherein said first surface of a creep resistant alloy and said second surface of a creep resistant alloy are a Grade 91 or Grade 92 creep strength enhanced ferritic (CSEF) steel.

4. The method of forming a weld of claim 2 wherein said first surface of a creep resistant alloy and said second surface of a creep resistant alloy are reduced activation ferritic-martensitic (RAFM) steels.

5. The method of forming a weld of claim 2 wherein said first surface's creep resistant alloy and said second surface's creep resistant alloy are the same creep resistant alloy.

6. The method of forming a weld of claim 2 wherein said first surface, said second surface and said weld form the longitudinal seam of a pipe.

7. The method of forming a weld of claim 1 wherein said step of tempering including heating said weld at a rate of 10° C. per second or greater includes induction heating.

8. The method of forming a weld of claim 1 wherein said step of tempering including heating said weld at a rate of 10° C. per second or greater includes use of a laser.

9. The method of forming a weld of claim 1 wherein said first surface of a creep resistant alloy is Grade 91 or Grade 92 creep strength enhanced ferritic (CSEF) steel.

10. The method of forming a weld of claim 1 wherein said first surface of a creep resistant alloy is reduced activation ferritic-martensitic (RAFM) steel.

* * * * *